US005466533A

United States Patent [19]

Fitzgerald et al.

[11] Patent Number: 5,466,533
[45] Date of Patent: Nov. 14, 1995

[54] ZINC OXIDE FILLED DIPHENYLSILOXANE-DIMETHYLSILOXANE FUSER MEMBER FOR FIXING TONER TO A SUBSTRATE

[75] Inventors: John J. Fitzgerald, Webster; Wayne T. Ferrar, Fairport; Tonya D. Binga; Michael W. Fichtner, both of Rochester, all of N.Y.

[73] Assignee: Eastman Kodak Company, Rochester, N.Y.

[21] Appl. No.: 268,136

[22] Filed: Jun. 29, 1994

[51] Int. Cl.[6] .................................................. B32B 9/04
[52] U.S. Cl. ..................... 428/447; 428/411.1; 428/450; 428/451; 428/689; 428/906; 428/913; 355/284; 492/53; 492/54; 492/56
[58] Field of Search .................................. 430/126, 124; 355/271, 277, 284; 428/35.8, 323, 421, 446, 447, 450, 411.1, 447, 450, 451, 689, 906, 913; 492/53, 54, 56

[56] References Cited

U.S. PATENT DOCUMENTS

| | | | |
|---|---|---|---|
| 4,264,181 | 4/1981 | Lentz et al. | 355/13 |
| 4,373,239 | 2/1983 | Henry et al. | 29/132 |
| 4,375,505 | 3/1983 | Newkirk | 430/99 |
| 4,430,406 | 2/1984 | Newkirk et al. | 430/99 |
| 4,501,482 | 2/1985 | Stryjewski | 355/3 |
| 4,515,884 | 5/1985 | Field et aL. | 430/99 |
| 4,518,655 | 5/1985 | Henry et al. | 428/329 |
| 4,853,737 | 8/1989 | Hartley et al. | 355/289 |
| 4,970,098 | 11/1990 | Ayala-Esquilin et al. | 428/36.6 |
| 5,017,432 | 5/1991 | Eddy et al. | 428/422 |
| 5,177,552 | 1/1993 | Isogai et al. | 355/285 |
| 5,219,612 | 6/1993 | Bingham et al. | 427/194 |
| 5,269,740 | 12/1993 | Fizgerald et al. | 492/96 |
| 5,292,562 | 3/1994 | Fitzgerald et al. | 428/35.8 |
| 5,292,606 | 3/1994 | Fitzgerald | 428/35.8 |

OTHER PUBLICATIONS

J. J. Fitzgerald et al, "The Effect of Cyclic Stress on the Physical Properties of a Poly(Dimethylsiloxane) Elastomer," *Polymer Engineering & Science*, Sep. 1992, vol. 32, No. 18, pp. 1350–1357.

*Primary Examiner*—Patrick J. Ryan
*Assistant Examiner*—William A. Krynski
*Attorney, Agent, or Firm*—Anne B. Kiernan; Robert Luke Walker

[57] ABSTRACT

A fuser member comprising a core and a layer overlying said core. The layer comprises a crosslinked polydiphenylsiloxane-poly(dimethylsiloxane) elastomer having zinc oxide particles dispersed therein in a concentration of from 20 to 40 percent of the total volume of the layer.

20 Claims, 5 Drawing Sheets

ZINC OXIDE FILLED DIPHENYLSILOXANE-DIMETHYLSILOXANE FUSER MEMBER FOR FIXING TONER TO A SUBSTRATE

FIELD OF THE INVENTION

This invention relates to a fuser roll useful for heat-fixing a heat-softenable toner material to a substrate. More particularly, the invention relates to a zinc oxide filled polydiphenylsiloxane-polydimethylsiloxane fuser roll having improved stability under conditions of elevated temperature and cyclic stress.

BACKGROUND OF THE INVENTION

Heat-softenable toners are widely used in imaging methods such as electrostatography, wherein electrically charged toner is deposited imagewise on a dielectric or photoconductive element bearing an electrostatic latent image. Most often in such methods, the toner is then transferred to a surface of another substrate, such as, e.g., a receiver sheet comprising paper or a transparent film, where it is then fixed in place to yield the final desired toner image.

When heat-softenable toners, comprising, e.g., thermoplastic polymeric binders, are employed, the usual method of fixing the toner in place involves applying heat to the toner once it is on the receiver sheet surface to soften it and then allowing or causing the toner to cool.

One such well-known fusing method comprises passing the toner-bearing receiver sheet through the nip formed by a pair of opposing rolls, at least one of which (usually referred to as a fuser roll) is heated and contacts the toner-bearing surface of the receiver sheet in order to heat and soften the toner. The other roll (usually referred to as a pressure roll) serves to press the receiver sheet into contact with the fuser roll. In some other fusing methods, the configuration is varied and the "fuser roll" or "pressure roll" takes the form of a flat plate or belt. The description herein, while generally directed to a generally cylindrical fuser roll in combination with a generally cylindrical pressure roll, is not limited to fusing systems having members with those configurations. For that reason, the term "fuser member" is generally used herein in place of "fuser roll" and the term "pressure member" in place of "pressure roll".

The fuser member usually comprises a rigid core covered with a resilient material, which will be referred to herein as a "base cushion layer." The resilient base cushion layer and the amount of pressure exerted by the pressure member serve to establish the area of contact of the fuser member with the toner-bearing surface of the receiver sheet as it passes through the nip of the fuser member and pressure members. The size of this area of contact helps to establish the length of time that any given portion of the toner image will be in contact with and heated by the fuser member. The degree of hardness (often referred to as "storage modulus") and stability thereof, of the base cushion layer are important factors in establishing and maintaining the desired area of contact.

In some previous fusing systems, it has been advantageous to vary the pressure exerted by the pressure member against the receiver sheet and fuser member. This variation in pressure can be provided, for example in a fusing system having a pressure roll and a fuser roll, by slightly modifying the shape of the pressure roll. The variance of pressure, in the form of a gradient of pressure that changes along the direction through the nip that is parallel to the axes of the rolls, can be established, for example, by continuously varying the overall diameter of the pressure roll along the direction of its axis such that the diameter is smallest at the midpoint of the axis and largest at the ends of the axis, in order to give the pressure roll a sort of "bow tie" or "hourglass" shape. This will cause the pair of rolls to exert more pressure on the receiver sheet in the nip in the areas near the ends of the rolls than in the area about the midpoint of the rolls. This gradient of pressure helps to prevent wrinkles and cockle in the receiver sheet as it passes through the nip. Over time, however, the fuser roll begins to permanently deform to conform to the shape of the pressure roll and the gradient of pressure is reduced or lost, along with its attendant benefits. It has been found that permanent deformation (alternatively referred to as "creep") of the base cushion layer of the fuser member is the greatest contributor to this problem.

One type of material that has been widely employed in the past to form a resilient base cushion layer for fuser rolls is condensation-crosslinked poly(dimethylsiloxane) elastomer. "Poly(dimethylsiloxane)" will sometimes be alternatively referred to herein as "PDMS". The prior art has also taught or suggested that various fillers comprising inorganic particulate materials can be included in such PDMS base cushion layers to improve their mechanical strength and/or thermal conductivity. Higher thermal conductivity is advantageous when the fuser roll is heated by an internal heater, so that the heat can be efficiently and quickly transmitted toward the outer surface of the fuser roll and toward the toner on the receiver sheet it is intended to contact and fuse. Higher thermal conductivity is not so important when the roll is intended to be heated by an external heat source. Disclosure of such filled condensation-cured PDMS elastomers for fuser rolls can be found, for example, in U.S. Pat. Nos., 4,373,239; 4,430,406; and 4,518,655.

Optimal metal-filled elastomer fuser members have long been sought. At one time, it was predicted that:

"The metal of the metal-containing filler dispersed in the elastomer may be easily selected by one skilled in the art without undue experimentation by testing the metal-containing filler, such as a metal, metal alloy, metal oxide, metal salt or other metal compound, in an elastomer. The general classes of metals which are applicable to the present invention include those metals of Groups 1b, 2a, 2b, 3a, 3b, 4a, 4b, 5a, 5b, 6b, 7b, 8 and the rare earth elements of the Periodic Table." (U.S. Pat. No. 4,264,181 to Lentz et al, column 10, lines 42–53; also U.S. Pat. No. 4,272,179 to Seanor, column 10, lines 45–54.)

This prediction of easy selection of the metal for a metal-containing filler has proven false in the face of latter efforts in the art.

A metal-containing filler which provides good results in one elastomer may provide very poor results in another elastomer, even if the elastomers are very similar. In U.S. Pat. No. 4,264,181 to Lentz et al, good results were obtained when lead oxide was used as a filler in various fluoroelastomers (Viton E430, Viton E60C, Viton GH; Examples X, XI, XII). In U.S. Pat. No. 5,017,432 to Eddy et al, on the other hand, the use of lead oxide in similar fluoroelastomers (for example, Viton GF) is taught against on the basis that it would produce an unacceptable fuser member. In these fluoroelastomers, cupric oxide is preferred. Similarly, U.S. Pat. No. 4,515,884 to Field et al, discloses a fuser member which utilizes metal oxide filled polydimethylsiloxane. The metal oxides are iron oxide and tabular alumina. Calcined alumina is described as being unsuitable per se. (Column 9, line 50–Column 10 line 47.)

An additional difficulty that has faced those attempting to produce metal-filled elastomer fuser members has recently been identified. In the past, it was thought that various materials' suitability for use in fuser roll base cushion layers in terms of their stability during use—i.e., their ability to resist degradation (as evidenced by weight loss), creep, and changes in hardness, during use in fuser rolls—could be determined by subjecting samples of the materials to conditions of continuous high temperature and continuous high stress (i.e., pressure), and then measuring the resultant changes in weight, shape (e.g., length), and hardness (e.g., storage modulus). However, J. J. Fitzgerald et al, "The Effect of Cyclic Stress on the Physical Properties of a Poly(Dimethylsiloxane) Elastomer", *Polymer Engineering and Science*, Vol. 32, No. 18, (Sept. 1992), pp. 1350–1357; indicates that such testing does not accurately portray the stability the materials will exhibit during actual use in fuser roll base cushion layers and that dynamic testing, with cycles of loading and unloading is necessary. The publication cites other reports showing the same kind of results in studies of other elastomers. Accordingly, a device called a Mechanical Energy Resolver (sometimes alternatively referred to herein as an "MER") has been developed, which can be used to test samples of materials of interest for use in fuser roll base cushion layers. The device applies heat continuously to maintain the samples at a constant elevated temperature. The device also applies stress to the samples in the form of a compressive force, but does so in a manner such that the amount of compressive force applied varies cyclicly (i.e., sinusoidally). The results of such testing consistently correlate with, and therefore reliably predict, the degree of stability a material will exhibit in the base cushion layer of a fuser roll during actual use.

The realization of the need for dynamic testing has promised more accurate evaluation of filled elastomers, however, preparation of metal containing elastomers remains problematic. U.S. Pat. Nos. 4,515,884 to Field et al, and 5,017,432 to Eddy et al, cite large numbers of critical features or important aspects of their metal containing elastomers: choice of material (Field, column 9, lines 50–65 and column 10, lines 24–25), interaction of filler surface and elastomer (Field, column 9, lines 32–65), particle size (Field, column 10, lines 1–8 and lines 25–30; Eddy, column 9, line 65– column 10, line 3), concentration of metal-filler (Field, column 10, lines 9–23 and lines 31–47), capability of interacting with functional groups of release agent (Eddy, column 9, lines 26–30), reactivity of the metal filler with the elastomer (Eddy, column 9, lines 33–43), and acid-base characteristics of the metal filler (Eddy, column 9, lines 43–56). The lists of critical features and important aspects in Field and Eddy do not fully correlate. It is unknown whether this difference represents real differences in material characteristics or only differences in techniques and analysis.

One specific example of a condensation-crosslinked PDMS elastomer, which contains about 32–37 volume percent aluminum oxide filler and about 2–6 volume percent iron oxide filler, and which has been widely used and taught to be useful in fuser rolls, is sold under the trade name, EC4952, by the Emerson Cummings Co., U.S.A. However, it has been found that fuser rolls containing EC4952 cushion layers exhibit serious stability problems over time of use, i.e., significant degradation, creep, and changes in hardness, that greatly reduce their useful life. The present inventors have also found that MER test results correlate with and thus accurately predict the instability exhibited during actual use. Nevertheless, materials such as EC4952 initially provide very suitable resilience, hardness, and thermal conductivity for fuser roll cushion layers.

Some filled condensation-crosslinked PDMS elastomers are disclosed in U.S. Pat. No. 5,269,740 (copper oxide filler), U.S. Pat. No. 5,292,606 (zinc oxide filler), U.S. Pat. No. 5,292,562 (chromium oxide filler), U.S. patent application Ser. No. 08/167,584 (tin oxide filler), U.S. patent application Ser. No. 08/159,013 (nickel oxide filler). These materials all show much less change in hardness and creep than EC4952 or the PDMS elastomer with aluminum oxide filler. U.S. Pat. No. 5,292,606 and U.S. patent application Ser. No. 08/167,584 disclose that tin oxide filler and zinc oxide filler can provide very good results in PDMS.

PDMS elastomers have a particular shortcoming in use. In order to improve release of toner from the fuser roller during fusing, polydimethylsiloxane fluid, referred to as fusing oil, is commonly applied to the fusing roller during use. This can improve release characteristics, but has been found to cause swelling of filled PDMS elastomer base cushions. Unfortunately, the amount of polydimethylsiloxane fluid absorbed by the base cushion inside and outside the paper path tends to differ, resulting in differential swelling and fusing problems. Alternative fusing oils can be used to reduce swelling; however, those fusing oils are much more expensive.

U.S. Pat. No. 4,970,098 to Ayala-Esquillin et al teaches a condensation cross-linked diphenylsiloxane-dimethylsiloxane elastomer having 40 to 55 weight percent zinc oxide, 5 to 10 weight percent graphite, and 1 to 5 weight percent ceric dioxide.

It would therefore be very desirable to be able to provide a fuser member with a base cushion layer comprising a condensation-crosslinked elastomer containing appropriate fillers, wherein the cushion layer material will exhibit, under conditions of elevated temperature and cyclic stress, good resistance to degradative weight loss, creep, changes in hardness, and swelling. The present invention meets this need.

SUMMARY OF THE INVENTION

The invention provides a fuser member comprising a core and a layer overlying said core. The layer comprises a crosslinked polydiphenylsiloxane-poly(dimethylsiloxane) elastomer having zinc oxide particles dispersed therein in a concentration of from 20 to 40 percent of the total volume of the layer.

The fuser member of the invention has an elastomer layer that has been unexpectedly found to exhibit only minimal weight loss, creep, and changes in hardness; when subjected to prolonged conditions of elevated temperature and cyclic stress.

BRIEF DESCRIPTION OF THE FIGURES

The above-mentioned and other features and objects of this invention and the manner of attaining them will become more apparent and the invention itself will be better understood by reference to the following description of an embodiment of the invention taken in conjunction with the accompanying figures wherein.

DESCRIPTION OF PARTICULAR EMBODIMENTS

Figure 1:
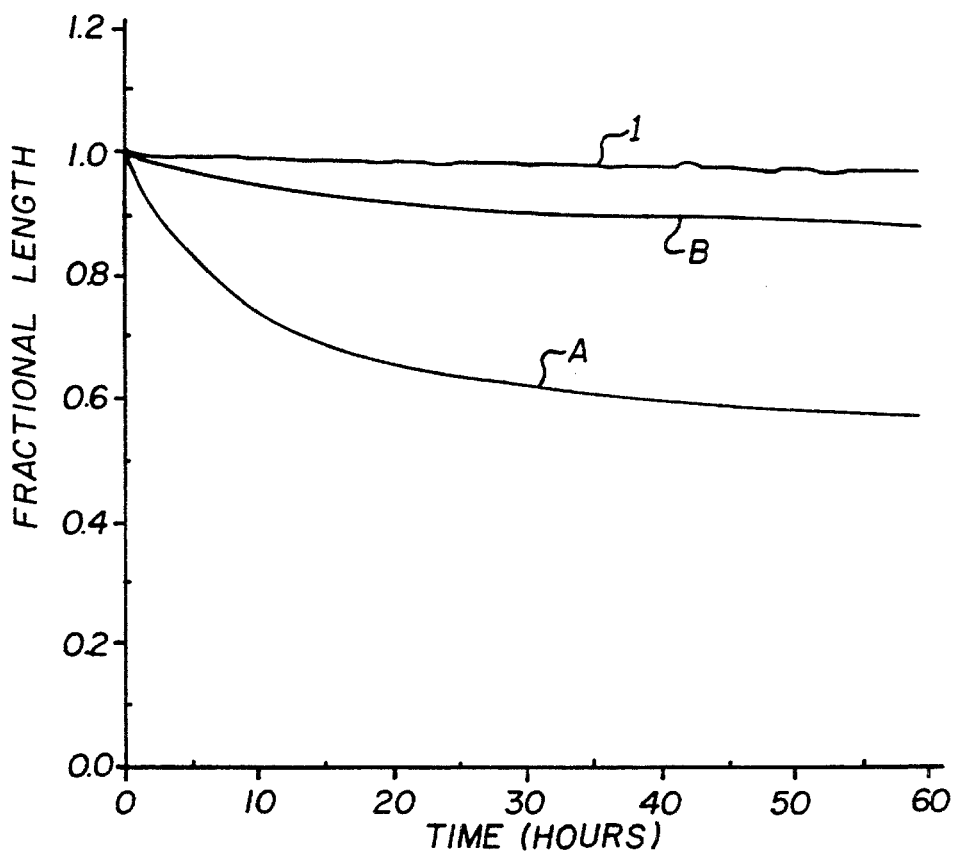
FIG. 1 is a graph of fractional length vs. time for the materials of Example 1 and Comparative Examples A–B.

The condensation-crosslinked polydiphenylsiloxane-polydimethylsiloxane (PDPS-PDMS) elastomer in the base cushion layer of fuser members provided by the invention can be formed by condensation reaction of silanol-terminated PDPS-PDMS polymers with multifunctional silanes. Silanol-terminated PDPS-PDMS polymers and methods of their preparation are well known. They are readily commercially available, e.g., from United Chemical (formerly Huls America, Inc.) of Piscataway, N.J., and have the structure:

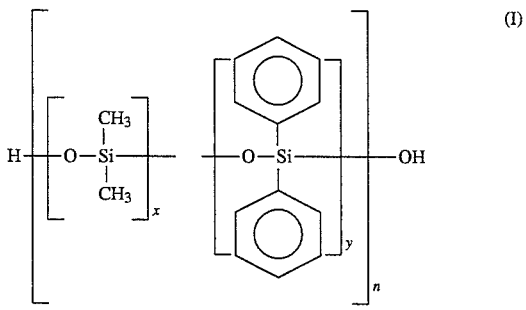

The values of x and y are proportional to the mole or formula percentages of each subunit relative to the molar sum of dimethyl and diphenyl subunits. The mole percentage of diphenyl subunits, y, is from 1 to 25 mole percent. In a preferred embodiment of the invention, the siloxane binder is from about 2 to about 20 mole percent diphenyl. In a more preferred embodiment of the invention, the siloxane binder is about 14 mole percent diphenyl.

For purpose of the present invention n is an integer such that the Structure (I) polymer has a number average molecular weight of from 400 to 310,000. If the molecular weight were below 400, the final crosslinked PDPS-PDMS would have a high crosslink density that would make the material too hard and brittle, and not resilient enough to serve practically in a base cushion layer. If the molecular weight were above 310,000, the final crosslinked PDPS-PDMS would be too unstable under conditions of high temperature and cyclic stress (i.e., there would be too much creep and change in hardness over time), even when filled in accordance with the invention.

The condensation-crosslinked polydiphenylsiloxane-polydimethylsiloxane (PDPS-PDMS) elastomer in the base cushion layer of the fuser members of the invention has in order of occurrence: dimethyl subunits and diphenyl subunits. It is currently preferred that the PDPS-PDMS elastomer have only dimethyl and diphenyl subunits; however, the PDPS-PDMS elastomer can have a small percentage of other subunits, as long as physical characteristics of the resulting fuser member remain substantially unchanged. For example, some dimethyl subunits could be replaced by other dialkyl, such as diethyl.

The multifunctional silanes that can serve as crosslinking agents for the Structure (I) polymers are well known for this purpose. Each of such silanes comprises a silicon atom bonded to at least three groups that are functional to condense with the hydroxy end groups of the Structure (I) polymers to thereby create siloxane crosslinks through the silicon atom of the silane. The functional groups of the silanes can be, for example, acyloxy (R—COO—), alkenoxy ($CH_2$=C(R)O—), alkoxy (R—O—), dialkylamino ($R_2$N—), or alkyliminoxy ($R_2$C=N—O—) groups, wherein R represents an alkyl moiety. Some specific examples of suitable multifunctional silane crosslinking agents are methyltrimethoxysilane, tetraethoxysilane, methyltripropenoxysilane, methyltriacetoxysilane, methyltris(butanone oxime)silane, and methyltris(diethylamino)silane.

In the case where alkoxy functional groups are employed, the condensation crosslinking reaction is carried out with the aid of a catalyst, such as, for example, a titanate, chloride, oxide, or carboxylic acid salt of zinc, tin, iron, or lead. Some specific examples of suitable catalysts are zinc octoate, dibutyltin diacetate, ferric chloride, and lead dioxide.

The zinc oxide particles employed as filler in the base cushion layer of a fuser member of the invention can be obtained from any convenient commercial source, e.g., Magnesium Electron, Inc. of Flemington, N.J. The particle size does not appear to be critical. Particle sizes anywhere in the range of 0.1 to 100 micrometers have been found to be acceptable. In the examples presented below the zinc oxide particles were from 1 to 40 micrometers in diameter.

The zinc oxide filler particles are mixed with the Structure (I) polymer and multifunctional silane crosslinker prior to curing the mix on the fuser member core to form the base cushion layer. The zinc oxide particles comprise from 20 to 40 percent of the total volume of the base cushion layer. Concentrations less than 20 volume percent may not provide the degree of stability desired to the layer. Concentrations greater than 40 volume percent will render the layer too hard to provide the desired area of contact with the toner-bearing receiver sheet.

In cases where it is intended that the fuser member be heated by an internal heater, it is desirable that the base cushion layer have a relatively high thermal conductivity, so that the heat can be efficiently and quickly transmitted toward the outer surface of the fuser member that will contact the toner intended to be fused. Zinc oxide filler particles increase the thermal conductivity of a condensation-crosslinked PDPS-PDMS base cushion layer. When zinc oxide particles are dispersed in the base cushion layer at a concentration of from 20 to 40 percent of the total volume of the layer, the thermal conductivity of the layer is in the range of about 0.42 to 0.81 W/mK at 175° C. This is comparable to previously known formulations such as EC4952.

Fuser members in accordance with the invention can also have one or more other layers over the base cushion layer, if desired. This allows one not to be concerned with the wear-resistance and toner-release properties of the base cushion layer. Properties such as abrasion-resistance and the ability to fuse toner without having some of the toner adhere to the fuser member and be pulled away from the receiver sheet as it exits the nip of the rolls, can be provided by such other layer or layers over the base cushion layer, as is well known in the art.

In some fusing systems a release oil, such as a PDMS oil, is continually provided and coated over the outermost surface of the fuser member during use, in order to aid the roll in releasing from the toner it contacts during the fusing operation. The zinc oxide filled, condensation-crosslinked PDPS-PDMS base cushion layer of the fuser member of the invention is substantially resistant to swelling. In a preferred embodiment of the invention, the change in size due to swelling is less than 15 to 20 percent. In an even more preferred embodiment of the invention, the change in size due to swelling is less than 5 to 10 percent. If even less swelling is desired, materials for one or more layers over the base cushion layer can be chosen to provide a barrier that prevents release oil from coming into contact with the base cushion layer, as is also well known in the art.

For description of other layers and materials therefor that can be usefully provided over fuser member base cushion layers, see, for example, U.S. Pat. Nos. 4,375,505; 4,430,406; 4,501,482; and 4,853,737. In some specific embodiments of the present invention, the base cushion layer has one other layer thereover, which is an oil-barrier layer comprising poly(vinylidene fluoride-co-hexafluoropropylene), a material commercially available, for example, from DuPont, U.S.A., under the trademark, Viton A. In some other specific embodiments, there are two layers over the base cushion layer, e.g., an oil-barrier layer and, thereover, an outermost layer that provides good wear-resistance and toner-release properties, comprising, for example, a vinyl-addition-crosslinked PDPS-PDMS having silica and titania fillers dispersed therein, such as is commercially available from Dow-Corning, U.S.A., under the trademark, Silastic E.

Usually, the other layer or layers, when employed, are flexible but thinner than the base cushion layer, so that the base cushion layer can provide the desired resilience to the fuser member, and the other layers can flex to conform to that resilience without having to be resilient themselves. The thickness of the base cushion layer and other layers will be chosen with consideration of the requirements of the particular application intended. For example, base cushion layer thicknesses in the range from 0.6 to 5.0 mm have been found to be appropriate for various applications. In some embodiments of the present invention, the base cushion layer is about 2.5 mm thick, and any oil-barrier and/or wear-resistant toner-release layers thereover are each about 25 to 30 micrometers thick.

The core of the fuser member is usually cylindrical in shape. It comprises any rigid metal or plastic substance. Metals are preferred when the fuser member is to be internally heated, because of their generally higher thermal conductivity. Suitable core materials include, e.g., aluminum, steel, various alloys, and polymeric materials such as thermoset resins, with or without fiber reinforcement. The core can be a support which has been conversion coated and primed with metal alkoxide primer in accordance with a U.S. Pat. No. Application filed by Allen Kass, Oct. 21, 1993, entitled "FUSING MEMBER FOR ELECTROSTATOGRAPHIC REPRODUCING APPARATUS AND METHOD FOR PREPARING FUSING MEMBER"; the specification of which is hereby incorporated by reference herein.

To form the base cushion layer of a fuser member in accordance with the invention, the Structure (I) polymer, a slight excess of the stoichiometric amount of multifunctional silane to form crosslinks with all the hydroxy end groups of the Structure (I) polymer, and the appropriate amount of zinc oxide filler are thoroughly mixed on a three-roll mill. If a catalyst is necessary, it is then added to the mix with thorough stirring. The mix is then degassed and injected into a mold surrounding the fuser member core to mold the material onto the core. The covered core remains in the mold for a time sufficient for some crosslinking to occur (e.g., 18 hours). The covered roll is then removed from the mold and heated to accelerate the remaining crosslinking. The other layer or layers are then coated thereover by any appropriate method.

The invention is further illustrated by the following Examples and Comparative Examples.

EXAMPLE 1

35 Vol % zinc Oxide; 14% diphenyl

Sample slabs of filled condensation-crosslinked PDPS-PDMS elastomer were prepared by mixing Structure (I) silanol-terminated PDPS-PDMS, tetraethoxysilane (also referred to as "TEOS") crosslinking agent, and particulate filler on a three-roll mill and then stirring dibutyltin diacetate catalyst into the mix. The formulation was degassed and injected into a mold to cure for 48 hours at 25° C. and 50% relative humidity. The resultant slab was removed from the mold and further cured in an air-circulating oven for 16 hours at 205° C. The final filled condensation-crosslinked slab was 1.9 mm thick. Circular disks (12 mm diameter) were cut from the slab.

The storage modulus determination was done in accordance with the method of calculation described in Fitzgerald, et al., "The Effect of Cyclic Stress on the Physical Properties of a Poly(dimethylsiloxane) Elastomer", Polymer Engineering and Science, Vol. 32, No. 18 (September 1992), pp. 1350–1357. Six of the circular disks were stacked, one upon the other, weighed, and then placed in a test instrument called a Mechanical Energy Resolver (also referred to herein as an "MER"), commercially available from Instrumentors, Inc. Strongsville, Ohio, U.S.A. The instrument heated the stack to 218° C. and imposed a static compressive force of 8 kg on the stack. The length of the stack under the initial compressive force was then measured, as was the initial hardness (expressed in terms of "Initial storage modulus"). The MER then imposed cyclic stress on the sample stack by sinusoidally varying the initial compressive force by 4 kg rms at a frequency of 30 Hz for 60 hours, while maintaining the 218° C. temperature. After 60 hours, the final hardness ("Final storage modulus") and length of the six-disk stack under the static 8 kg compressive force were measured, as was the final weight of the sample stack. Results of these tests are presented in FIGS. 1–2 and Table 1.

In this example the formulation employed to prepare the samples comprised: 61.56 Volume percent (19.51 weight percent) silanol-terminated 14 wt. % PDPS-86 wt. % PDMS, marketed commercially by Hules Americal of Piscataway, N.Y., under the trade designation, PS086; 3.22 vol. % (1.02 wt %) TEOS crosslinking agent; 35.00 vol % (78.87 wt %) zinc oxide particles; and 0.23 vol. % (0.11 wt %) dibutyltin diacetate catalyst.

Figure 2:
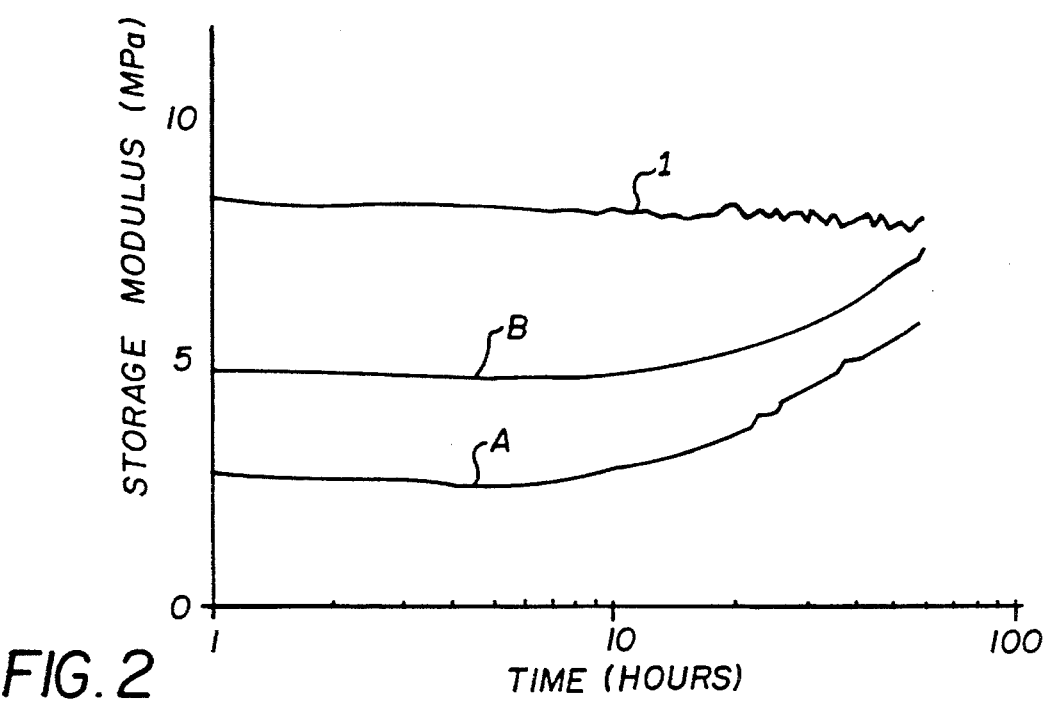
FIG. 2 is a graph of storage modulus vs. time for the materials of Example 1 and Comparative Examples A–B.

Results are presented in FIGS. 1–2 and Table 1.

A fuser member in accordance with the invention could be prepared as follows. The outer surface of a rigid cylindrical aluminum core would be scrubbed clean, rinsed with hot water, and dried. To this core would be applied a thin layer of primer (obtainable commercially from General Electric Co., U.S.A., under the trade designation S54044) using a brush and then drying in ambient air (room temperature) for one hour.

The base cushion layer formulation described above would then be injected into a mold surrounding the core to mold the base cushion layer to the core. The material would then be left in the mold at room temperature for 18 hours. The covered roll would then be removed from the mold, allowed to stand for 2 days, then heated slowly up to a temperature of 232° C. over 18 hours, and then maintained at 232° C. for another 18 hours to complete the crosslinking. The resultant base cushion layer would have a thickness of about 2.5 mm. An oil-barrier layer of poly(vinylidene fluoride-co-hexafluoropropylene) (obtainable commercially from DuPont, U.S.A., under the trademark, Viton A) could then be coated to a thickness of about 25 micrometers on the base cushion layer to yield the final fuser member.

Comparative Example

35 Vol % aluminum oxide; 14% diphenyl

Sample circular disks were prepared and tested as described in Example 1, except that the samples contained 35 vol % particulate aluminum oxide filler, instead of the 35 vol. % zinc oxide particulate filler employed in Example 1. Results are presented in FIGS. 1–2 and Table 1 below.

The aluminum oxide filled material of Comparative Example A was more unstable under conditions of elevated temperature and cyclic stress than the zinc oxide filled material of Example 1, exhibiting more weight loss, change in storage modulus, and creep (change in length).

Comparative Example B

35 Vol % tin oxide; 14% diphenyl

Sample circular disks were prepared and tested as in Example 1, except that, instead of 35 vol. % tin oxide, the samples of Comparative Example B contained 35 vol. % tin oxide.

Results are presented in FIGS. 1–2 and Table 1. In comparison to the zinc oxide filled material of Example 1, the tin oxide filled materials showed decreased weight loss, change in length; and change in storage modulus.

Comparative Example C–E

100% PDMS with (Comp. Ex. C)35 Vol. % tin oxide, (Comp. Ex. D)35 Vol. % zinc oxide, (Comp. Ex. E)35 Vol. % aluminum oxide Sample circular disks were prepared and tested as in Example 1 and Comparative Examples A and B, except that silanol terminated 100% polydimethylsiloxane (PDMS) was used instead of silanol-terminated 14 wt.% PDPS-86 wt.% PDMS. The PDMS had a weight average molecular weight of about 18,000 and was obtained commercially from Hules America of Piscataway, N.J., under the trade designation PS 3425.

Figure 3A:
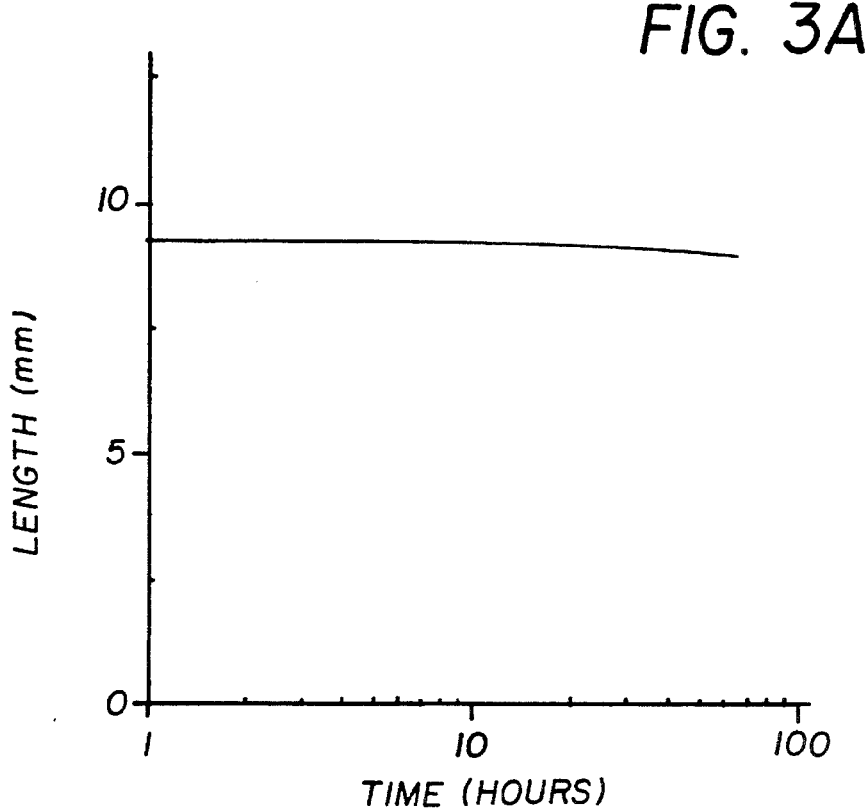
FIG. 3a is a graph of fractional length vs. time for the materials of Comparative Example C.
Figure 3B:
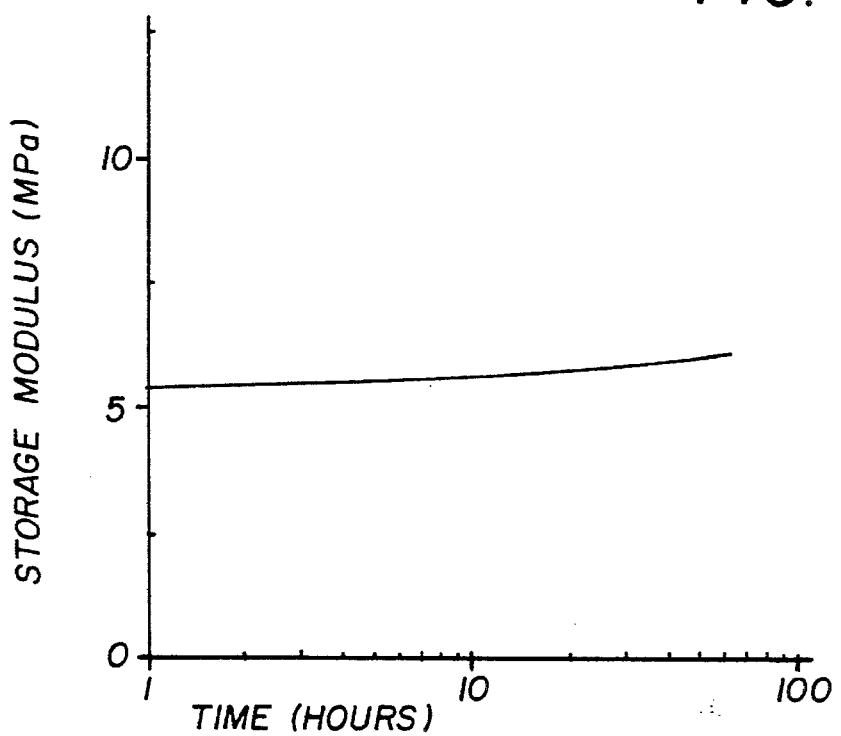
FIG. 3b is a graph of storage modulus vs. time for the materials of Comparative Example C.
Figure 4A:
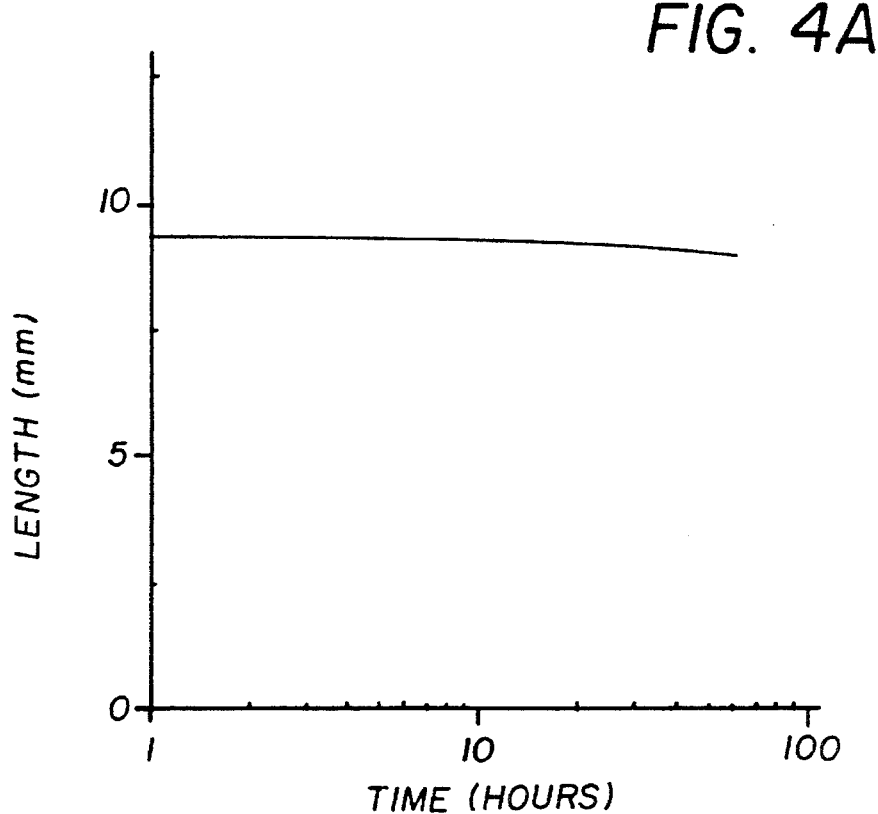
FIG. 4a is a graph of fractional length vs. time for the materials of Comparative Examples C–E.
Figure 4B:
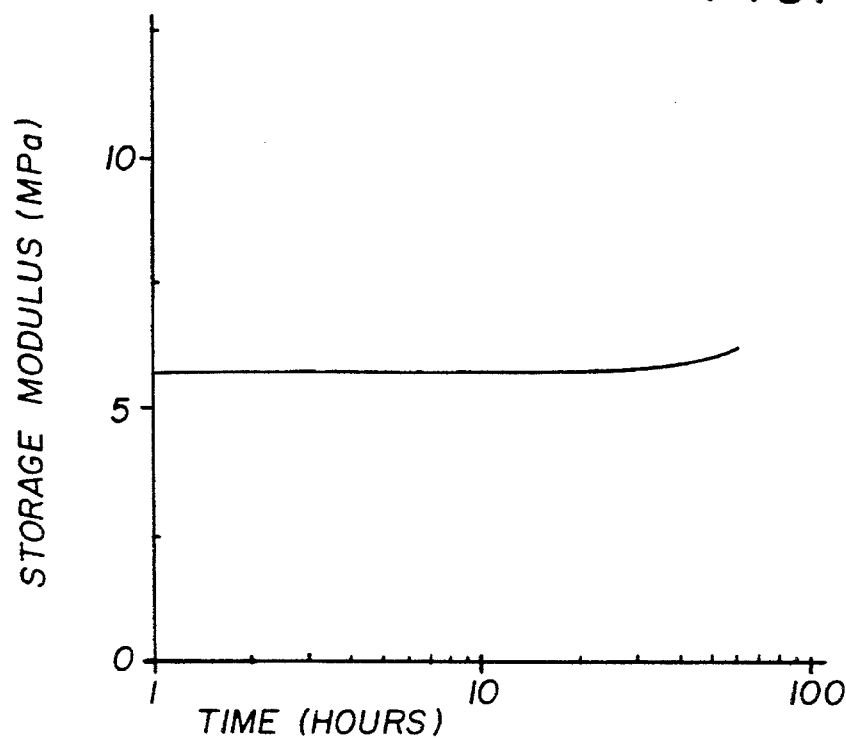
FIG. 4b is a graph of storage modulus vs. time for the material of Comparative Example D.
Figure 5A:
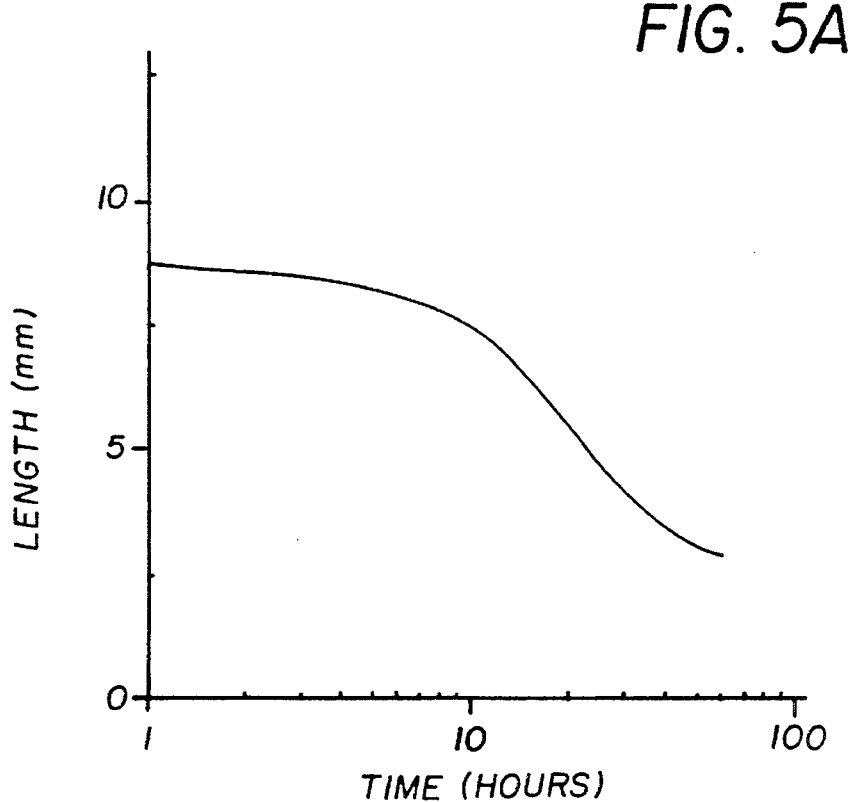
FIG 5a is a graph of fractional length vs. time for the materials of Comparative Examples C–E.
Figure 5B:
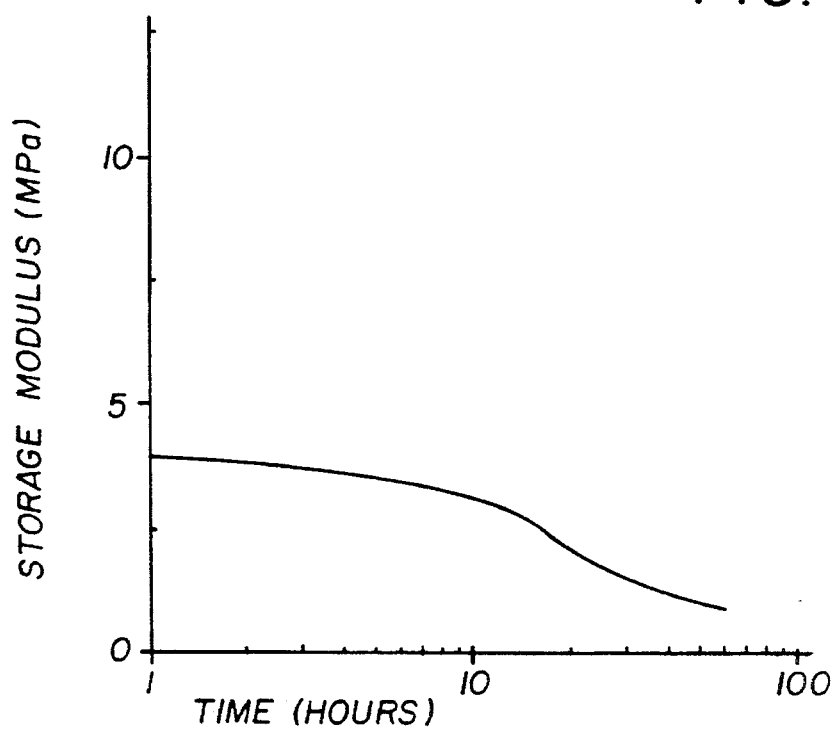
FIG. 5b is a graph of storage modulus vs. time for the materials of Comparative Example E.

Results of the tests are presented in FIGS. 3–5 and Table 1, below, and show that, both the tin oxide and zinc oxide filled 100% PDMS materials showed good results in terms of weight loss, change in length and change in storage modulus and the aluminum oxide showed poor results.

Comparative Examples F–H

4 Wt % diphenyl with (Comp. Ex. F)20 Vol % tin oxide; (Comp. Ex. G)25 Vol % tin oxide; (Comp. Ex. H)35 Vol % tin oxide Sample circular disks of base cushion material in accordance with the invention were prepared and tested as described in Example 1.The formulation was similar to that of Example 1, except that 4 wt. % diphenyl-96 wt. % dimethysiloxane was used instead of 14 wt. % diphenyl-86 wt. % dimethysiloxane; and the samples of Comparative Examples F, G, and H, contained 20, 25, and 35 vol. % tin oxide, respectively.

Figure 6:
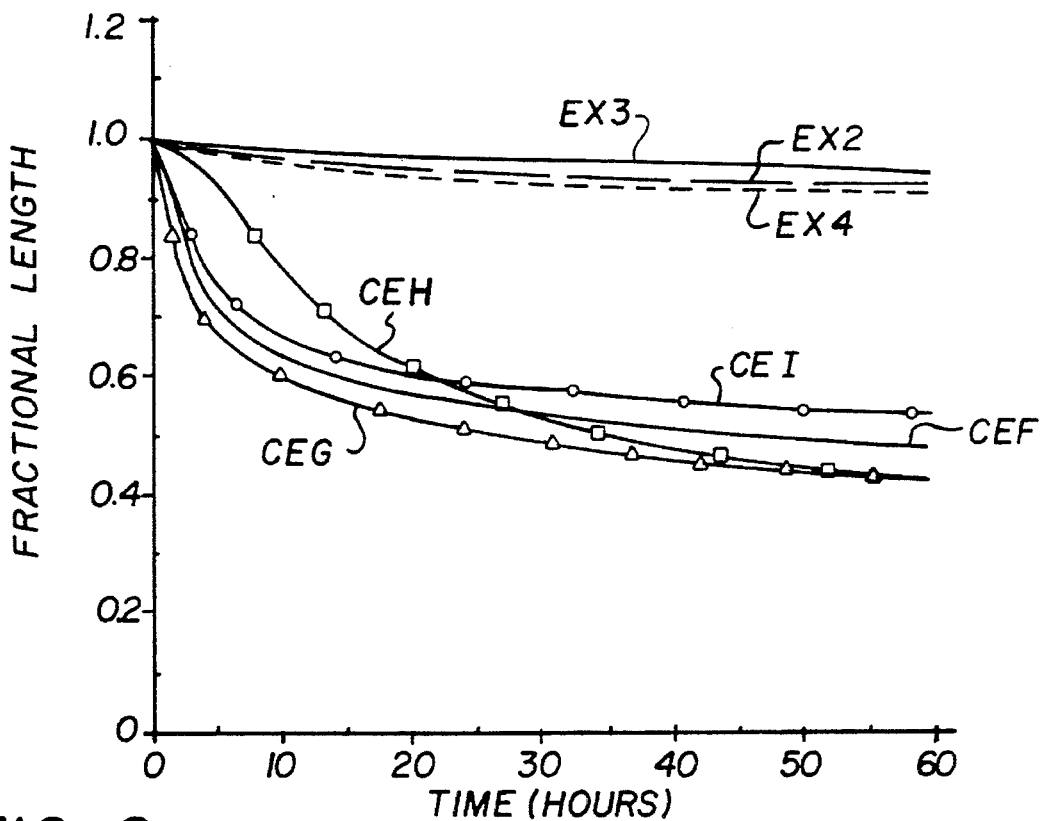
FIG. 6 is a graph of fractional length vs. time for the materials of Examples 2–4 and Comparative Examples F–I.
Figure 7:
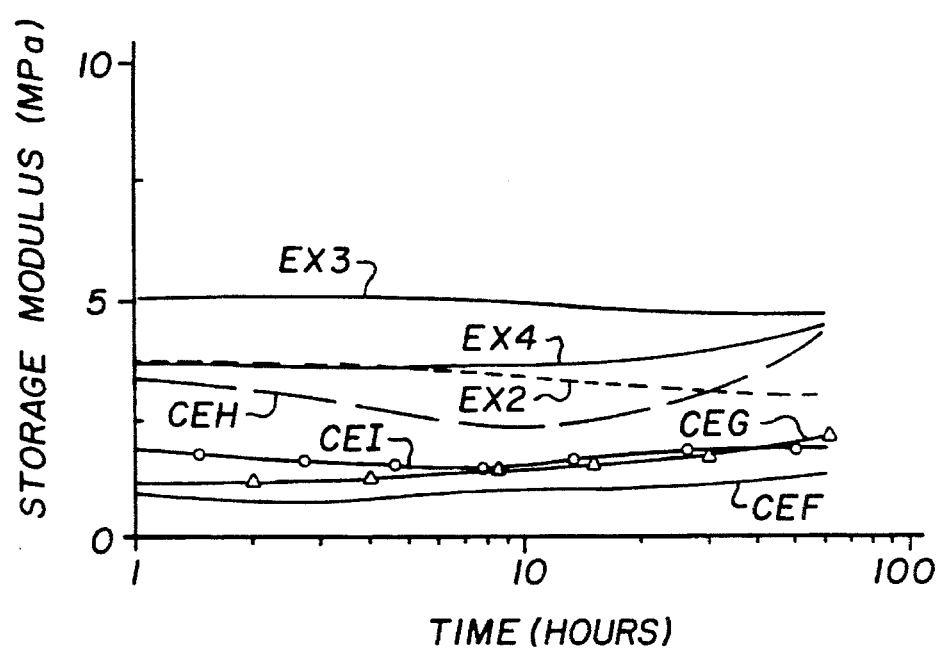
FIG. 7 is a graph of storage modulus vs. time for the materials of Examples 2–4 and Comparative Examples F–I.

Results are presented in FIGS. 6–7 and Table 1. The materials of Examples 2–4 exhibited good stability under conditions of elevated temperature and cyclic stress.

Comparative Examples I–L

4 Wt % diphenyl (Comp. Ex. F)15 Vol % aluminum oxide, (Comp. Ex. G)25 Vol % aluminum oxide, (Comp. Ex. H)35 Vol % aluminum oxide, (Comp. Ex. I)20 Vol % titanium oxide Sample circular disks were prepared and tested as in Examples 2–4, except that, instead of tin oxide, 15, 25, and 35 Vol% aluminum oxide, and 20 Vol% titanium oxide fillers were used.

Results are presented in FIGS. 6–7 and Table 1. Comparative Examples F–I and Comparative Examples I–L show moderate changes in storage modulus for all of the materials except 35 Vol. % aluminum oxide filled. Weight loss was low for the tin oxide filled materials, moderate for titanium oxide filled and high for aluminum filled. Change in length was slight for the tin oxide filled materials and high for the aluminum oxide and titanium oxide filled materials.

TABLE 1

| Ex or Comp Ex | Initial storage modulus (MPa) | Final storage modulus (MPa) | Change in storage modulus (%) | Change in length (%) | Weight loss (%) |
|---|---|---|---|---|---|
| Ex 1 | 5.3 | 7.2 | 36 | 12 | 0.58 |
| Comp Ex A | 3.3 | 4.3 | 30 | 58 | 2.48 |
| Comp Ex B | 8.4 | 7.9 | 6.0 | 3 | 0.27 |
| Comp Ex C | 5.3 | 6.0 | 13 | 3.3 | 0.25 |
| Comp Ex D | 5.6 | 5.9 | 5.4 | 4.3 | 0.52 |
| Comp Ex E | 3.7 | 0.9 | 75 | 67 | 7.39 |
| Ex F | 3.9 | 3.1 | 21 | 10 | 0.43 |
| Ex G | 5.3 | 4.7 | 11 | 7.0 | 0.35 |
| Ex H | 10.1 | 9.6 | 10 | 11 | 0.34 |
| Comp Ex I | 1.1 | 1.3 | 18 | 53 | 5.01 |
| Comp Ex J | 1.5 | 2.2 | 47 | 58 | 5.65 |
| Comp Ex K | 3.3 | 4.3 | 30 | 61 | 6.77 |
| Comp Ex L | 2.2 | 1.9 | 14 | 47 | 1.32 |

The invention has been described in detail with particular reference to certain preferred embodiments thereof, but it should be appreciated that variations and modifications can be effected within the scope of the invention.

What is claimed is:

1. A fuser member comprising a core and a layer overlying said core, said layer comprising: a crosslinked polydiphenylsiloxane-poly(dimethylsiloxane) elastomer, said layer having filler dispersed therein in a concentration of from 20 to 40 percent of the total volume of said layer, said filler consisting essentially of zinc oxide particles, said crosslinked polydiphenylsiloxane-poly(dimethylsiloxane) elastomer having a number average molecular weight of from 400 to 310,000.

2. The fuser member of claim 1, wherein said elastomer is less than about 20 mole percent polydiphenylsiloxane.

3. The fuser member of claim 1, wherein said elastomer is from about 3 to about 15 mole percent polydiphenylsiloxane.

4. The fuser member of claim 3, wherein the concentration of zinc oxide particles is from 30 to 40 percent of the total volume of said layer.

5. The fuser member of claim 1, wherein the concentration of zinc oxide particles is from 30 to 40 percent of the total volume of said layer.

6. The fuser member of claim 1, wherein the crosslinked polydiphenylsiloxane-poly(dimethylsiloxane) elastomer has been formed by condensation reaction of silanol-terminated polydiphenylsiloxane-poly(dimethylsiloxane) polymeric units with multifunctional silanes, each of said silanes comprising a silicon atom bonded to at least three groups that are functional to condense with hydroxy end groups of the silanol-terminated polydiphenylsiloxane-poly(dimethylsiloxane) polymeric units to thereby crosslink the polymeric units through the silicon atom.

7. The fuser member of claim 6, wherein each of the functional groups of the multifunctional silanes independently comprises an acyloxy, alkenoxy, alkoxy, dialkylamino, or alkyliminoxy group.

8. The fuser member of claim 6, wherein the functional groups of the multifunctional silanes comprise alkoxy groups, and wherein the condensation reaction has been carried out with the aid of a catalyst for the reaction.

9. The fuser member of claim 1, wherein said member further comprises at least one additional layer overlaying said layer overlying said core.

10. The fuser member of claim 9, wherein said additional layer comprises a copolymer having vinylidene fluoride and hexafluoropropylene subunits.

11. A fuser member comprising a core and a layer overlying said core, said layer comprising: a crosslinked polydiphenylsiloxane-poly(dimethylsiloxane) elastomer, said layer having zinc oxide particles dispersed therein in a concentration of from 20 to 40 percent of the total volume of said layer, said crosslinked polydiphenylsiloxane-poly(dimethylsiloxane) elastomer having a number average molecular weight of from 400 to 310,000 and said crosslinked polydiphenylsiloxane-poly(dimethylsiloxane) elastomer having been formed by condensation reaction of silanol-terminated polydiphenylsiloxane-poly(dimethylsiloxane) polymeric units with multifunctional silanes, each of said silanes comprising a silicon atom bonded to at least three groups that are functional to condense with hydroxy end groups of the silanol-terminated polydiphenylsiloxane-poly(dimethylsiloxane) polymeric units to thereby crosslink the polymeric units through the silicon atom.

12. The fuser member of claim 11, wherein said elastomer is less than about 20 mole percent polydiphenylsiloxane.

13. The fuser member of claim 11, wherein said elastomer is from about 3 to about 15 mole percent polydiphenylsiloxane.

14. The fuser member of claim 13, wherein the concentration of zinc oxide particles is from 30 to 40 percent of the total volume of said layer.

15. The fuser member of claim 11, wherein the concentration of zinc oxide particles is from 30 to 40 percent of the total volume of said layer.

16. The fuser member of claim 15, wherein each of the functional groups of the multifunctional silanes independently comprises an acyloxy, alkenoxy, alkoxy, dialkylamino, or alkyliminoxy group.

17. The fuser member of claim 15, wherein the functional groups of the multifunctional silanes comprise alkoxy groups, and wherein the condensation reaction has been carried out with the aid of a catalyst for the reaction.

18. The fuser member of claim 11, wherein said member further comprises at least one additional layer overlaying said layer overlying said core.

19. The fuser member of claim 18, wherein said additional layer comprises a copolymer having vinylidene fluoride and hexafluoropropylene subunits.

20. A fuser member comprising a core and a layer overlying said core, said layer comprising: a crosslinked polydiphenylsiloxane-poly(dimethylsiloxane) elastomer, said layer having filler dispersed therein in a concentration of from 20 to 40 percent of the total volume of said layer, said filler consisting essentially of zinc oxide particles, said crosslinked polydiphenylsiloxane-poly(dimethylsiloxane) elastomer having a number average molecular weight of from 400 to 310,000 and said crosslinked polydiphenylsiloxane-poly(dimethylsiloxane) elastomer having been formed by condensation reaction of silanol-terminated polydiphenylsiloxane-poly(dimethylsiloxane) polymeric units with multifunctional silanes, each of said silanes comprising a silicon atom bonded to at least three groups that are functional to condense with hydroxy end groups of the silanol-terminated polydiphenylsiloxane-poly(dimethylsiloxane) polymeric units to thereby crosslink the polymeric units through the silicon atom.

* * * * *